United States Patent
Igari

(10) Patent No.: US 7,930,307 B2
(45) Date of Patent: Apr. 19, 2011

(54) IMAGE CAPTURING APPARATUS AND CONTROL METHOD THEREOF

(75) Inventor: Toshinori Igari, Fuchu (JP)

(73) Assignee: Canon Kabushiki Kaisha

( * ) Notice: Subject to any disclaimer, the term of this patent is extended or adjusted under 35 U.S.C. 154(b) by 357 days.

(21) Appl. No.: 11/735,119

(22) Filed: Apr. 13, 2007

(65) Prior Publication Data

US 2007/0247646 A1 Oct. 25, 2007

(30) Foreign Application Priority Data

Apr. 20, 2006 (JP) ................. 2006-117186

(51) Int. Cl.
*G06F 7/00* (2006.01)
*G06F 17/30* (2006.01)
(52) U.S. Cl. ........ 707/755; 707/828; 715/810; 345/625; 358/3.23
(58) Field of Classification Search .......... 707/1, 2, 707/3, 821, 822, 828, 755, 829; 715/810; 345/418, 625
See application file for complete search history.

(56) References Cited

U.S. PATENT DOCUMENTS

| 6,996,276 | B2 * | 2/2006 | Liu et al. ................. 382/218 |
| 7,106,464 | B1 * | 9/2006 | Brylov .................... 358/1.15 |
| 2004/0165215 | A1 * | 8/2004 | Raguet et al. ............ 358/1.15 |
| 2006/0072813 | A1 * | 4/2006 | Matsumoto et al. ....... 382/162 |
| 2006/0206628 | A1 * | 9/2006 | Erez ........................... 710/8 |
| 2006/0259521 | A1 * | 11/2006 | Armenta et al. .......... 707/201 |
| 2006/0277160 | A1 * | 12/2006 | Singh et al. .................. 707/3 |

FOREIGN PATENT DOCUMENTS

| JP | 10-326167 A | 12/1998 |
| JP | 11-316821 A | 11/1999 |
| JP | 2003-084937 A | 3/2003 |
| JP | 2004-110741 A | 4/2004 |

* cited by examiner

*Primary Examiner* — Usmaan Saeed
*Assistant Examiner* — Amy Ng
(74) *Attorney, Agent, or Firm* — Fitzpatrick, Cella, Harper & Scinto

(57) ABSTRACT

When a folder icon is dropped on a scanner icon, a scan application determines a reference folder. The scan application searches the reference folder and, if necessary, a folder in an upper hierarchical layer for a read control information file. In accordance with the contents of the read control information file, the scan application instructs a scanner to scan image data.

6 Claims, 7 Drawing Sheets

FIG. 4

| | | | |
|---|---|---|---|
| READ CONTROL INFORMATION FILE GENERATION | | | ✕ |
| TYPE OF ORIGINAL | : | PAPER/PHOTOGRAPH ▼ | 402 |
| SIZE OF ORIGINAL | : | A4 ▼ | 403 |
| COLOR MODE | : | COLOR ▼ | 404 |
| OUTPUT RESOLUTION | : | 300 ▼ dpi | 405 |
| CONTOUR EMPHASIS | : | ON ▼ | 406 |
| MOIRE REDUCTION | : | OFF ▼ | 407 |
| DUST/FLAW REDUCTION | : | OFF ▼ | 408 |
| SAVE FORMAT | : | JPEG ▼ | 409 |
| OK | | CANCEL | |
| 410 | | 411 | |

401

IMAGE CAPTURING APPARATUS AND CONTROL METHOD THEREOF

BACKGROUND OF THE INVENTION

1. Field of the Invention

The present invention relates to an image capturing apparatus for capturing image data by controlling an image reading apparatus, and a control method thereof.

2. Description of the Related Art

A scanner as one type of an image reading apparatus can scan an original such as a photograph or document, and transmit the scanned original as image data to a PC (Personal Computer) connected by a USB cable or the like. When obtaining image data by using the scanner, the user of the PC must perform four steps of operations described below on an OS (Operating System) such as Microsoft Windows (registered trademark) in a typical case:

(1) Activate a scan application.
(2) Set read control information such as the resolution, color mode (color, grayscale, or black-and-white), and size of an original.
(3) Select a save destination folder of the obtained image data.
(4) Press a scan button.

When the scan button is pressed, the scanner starts scanning an original and transmits the image data to the PC. The PC saves the received image data in the save destination folder selected in step (3).

As described above, the user must perform many operations to scan an original, and this is cumbersome for the user. For example, the save destination folder initially presented in step (3) is not necessarily a folder that the user desires, but a predetermined folder such as "my documents" or a folder selected at last time by the user. An operation of finding and selecting a desired folder from this state is troublesome for the user.

Japanese Patent Laid-Open No. 11-316821, therefore, has proposed a technique that simplifies the save destination folder selecting operation by dealing an original set on the scanner as a virtual file. According to Japanese Patent Laid-Open No. 11-316821, when a user drags and drops this virtual file in a desired folder, the scanner starts scanning an original, and the obtained image data is saved in the drop destination folder.

Note that "drag and drop" is one method by which a user operates a computer. More specifically, a user presses a mouse button while a mouse pointer is superposed on an icon indicating a file or the like, moves (drags) the mouse pointer while pressing the mouse button, and releases (drops) the mouse button in another window or on another icon.

This technique described in Japanese Patent Laid-Open No. 11-316821 simplifies the save destination folder selecting operation. However, the read control information setting operation in step (2) described above is still troublesome for a user. For example, when successively reading a plurality of documents, the same read control information is often used for the same type of originals. However, different kinds of read control information are generally used to read different kinds of originals such as photographs and texts. Therefore, when reading different types of originals by frequently changing them, the read control information setting operation is extremely laborious for a user.

The present invention has been made in consideration of the above situation, and has as its feature to further simplify the operation necessary to scan an original by the scanner, thereby reducing user's labor.

SUMMARY OF THE INVENTION

According to one aspect of the present invention, an image capturing apparatus including an communication unit which communicates with an image reading apparatus, and a memory unit which manages data by using a plurality of folders, comprising:

a receiving unit adapted to receive input of control information for controlling the image reading apparatus;

a first storage unit adapted to store the control information received by the receiving unit in at least one of the plurality of folders designated by a user;

a first designation unit adapted to designate one of the plurality of folders as a folder for storing image data to be obtained from the image reading apparatus, in accordance with an instruction from the user;

a search unit adapted to search the folder designated by the first designation unit for the control information;

a first control unit adapted to control execution of reading image data by the image reading apparatus, in accordance with a result of search by the search unit;

a first obtaining unit adapted to obtain image data from the image reading apparatus under the control of the first control unit; and a second storage unit adapted to store the image data obtained by the first obtaining unit in the folder designated by the first designation unit.

According to another aspect of the present invention, an image capturing apparatus including an communications unit which communicates with an image reading apparatus, and a memory unit which manages data by using a plurality of folders, comprising:

a designation unit adapted to designate one of the data held in the memory unit, in accordance with an instruction from a user;

an extraction unit adapted to extract control information for controlling the image reading apparatus from the data designated by the designation unit;

a control unit adapted to control execution of reading image data by the image reading apparatus, in accordance with a result of extraction by the extraction unit;

an obtaining unit adapted to obtain image data from the image reading apparatus under the control of the control unit; and a storage unit adapted to store the image data obtained by the obtaining unit in a folder in which the data designated by the designation unit has been stored.

According to still another aspect of the present invention, a control method of an image capturing apparatus including an communications unit which communicates with an image reading apparatus, and a memory unit which manages data by using a plurality of folders, the method comprising:

a receiving step of receiving input of control information for controlling the image reading apparatus;

a first storage step of storing the control information received in the receiving step in at least one of the plurality of folders designated by a user;

a first designation step of designating one of the plurality of folders as a folder for storing image data to be obtained from the image reading apparatus, in accordance with an instruction from the user;

a search step of searching the folder designated in the first designation step for the control information;

a first control step of controlling execution of reading image data by the image reading apparatus, in accordance with a result of search in the search step;

a first obtaining step of obtaining image data from the image reading apparatus under the control in the first control step; and a second storage step of storing the image data obtained in the first obtaining step in the folder designated in the first designation step.

According to yet another aspect of the present invention, a control method of an image capturing apparatus including an communications unit which communicates with an image reading apparatus, and a memory unit which manages data by using a plurality of folders, the method comprising:

a designation step of designating one of the data held in the memory unit, in accordance with an instruction from a user;

an extraction step of extracting control information for controlling the image reading apparatus from the data designated in the designation step;

a control step of controlling execution of reading image data by the image reading apparatus, in accordance with a result of extraction in the extraction step;

an obtaining step of obtaining image data from the image reading apparatus under the control in the control step; and a storage step of storing the image data obtained in the obtaining step in a folder in which the data designated in the designation step has been stored.

According to still yet another aspect of the present invention, a computer program stored in a computer-readable storage medium to cause a computer to execute a control method of an image capturing apparatus including an communications unit which communicates with an image reading apparatus, and a memory unit which manages data by using a plurality of folders, the control method comprising:

a receiving step of receiving input of control information for controlling the image reading apparatus;

a first storage step of storing the control information received in the receiving step in at least one of the plurality of folders designated by a user;

a first designation step of designating one of the plurality of folders as a folder for storing image data to be obtained from the image reading apparatus, in accordance with an instruction from the user;

a search step of searching the folder designated in the first designation step for the control information;

a first control step of controlling execution of reading image data by the image reading apparatus, in accordance with a result of search in the search step;

a first obtaining step of obtaining image data from the image reading apparatus under the control in the first control step; and a second storage step of storing the image data obtained in the first obtaining step in the folder designated in the first designation step.

According to yet still another aspect of the present invention, a computer program stored in a computer-readable storage medium to cause a computer to execute a control method of an image capturing apparatus including an communications unit which communicates with an image reading apparatus, and a memory unit which manages data by using a plurality of folders, the control method comprising:

a designation step of designating one of the data held in the memory unit, in accordance with an instruction from a user;

an extraction step of extracting control information for controlling the image reading apparatus from the data designated in the designation step;

a control step of controlling execution of reading image data by the image reading apparatus, in accordance with a result of extraction in the extraction step;

an obtaining step of obtaining image data from the image reading apparatus under the control in the control step; and a storage step of storing the image data obtained in the obtaining step in a folder in which the data designated in the designation step has been stored.

Further features of the present invention will become apparent from the following description of exemplary embodiments (with reference to the attached drawings).

BRIEF DESCRIPTION OF THE DRAWINGS

FIG. 4 is a view showing an example of a read control information file generation window by which a user generates a read control information file;

DESCRIPTION OF THE EMBODIMENTS

Embodiments of the present invention will be explained below with reference to the accompanying drawings. The individual embodiments explained below will be useful to understand the various concepts such as the higher concept, medium concept, and lower concept of the present invention.

Note that the technical scope of the present invention is not limited to the individual embodiments explained below, but determined by the scope of claims. Note also that not all combinations of features explained in the embodiments are necessarily essential to the present invention.

First Embodiment

<Hardware Configuration>

Figure 1:
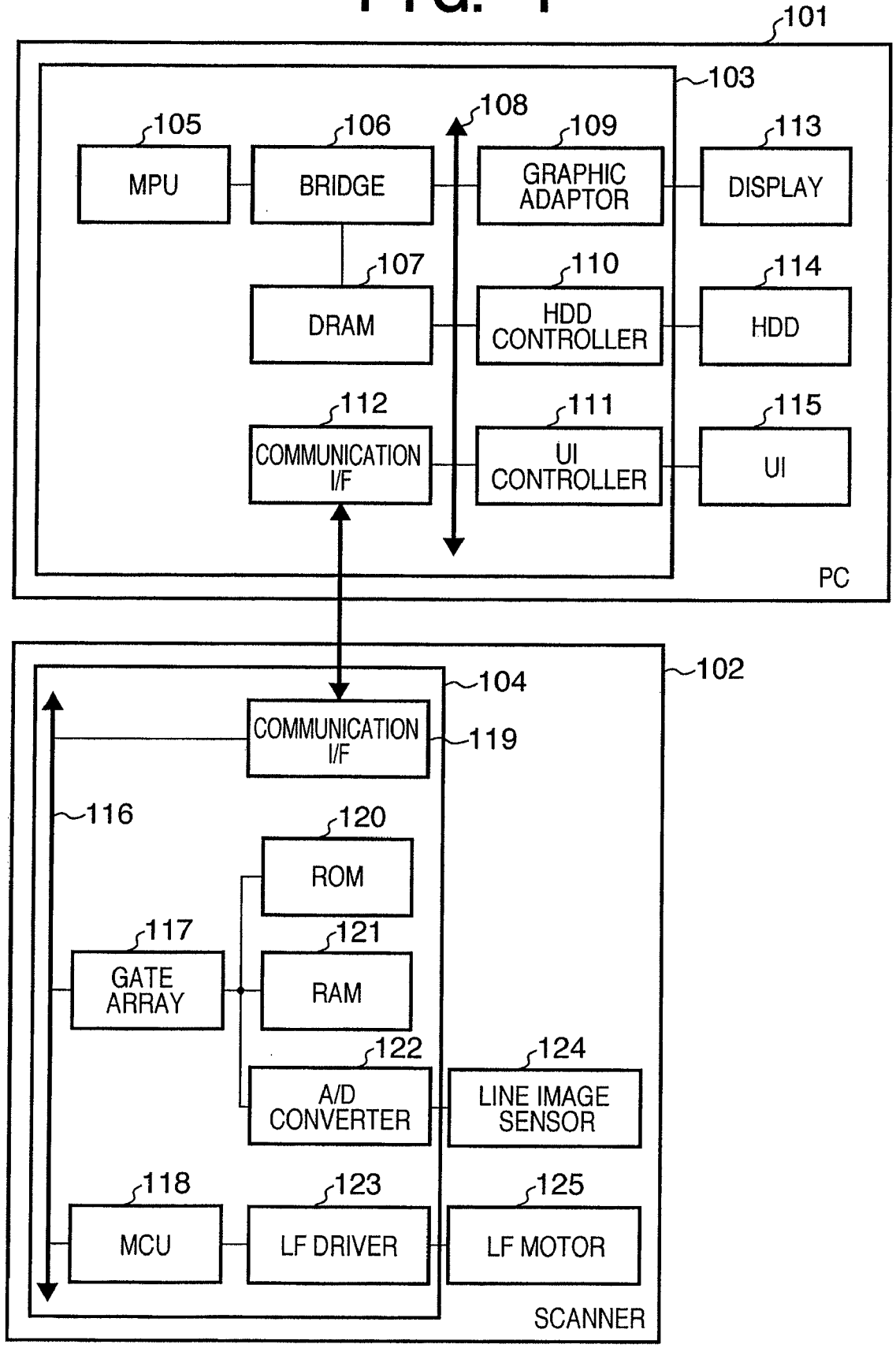
FIG. 1 is a block diagram showing the hardware configuration of a system according to the first embodiment.

FIG. 1 is a block diagram showing the hardware configuration of a system according to the first embodiment. In this embodiment, a PC (Personal Computer) 101 as an image capturing apparatus and a scanner 102 as an image reading apparatus are connected in a way that they can communicate with each other by wired or wireless communication.

The PC 101 comprises a processor 103, and a display 113, HDD (Hard Disk Drive) 114, and UI (User Interface) 115, which are connected to the processor 103.

The processor 103 of the PC 101 comprises an MPU (Micro Processing Unit) 105 that controls the whole of the PC 101 in accordance with control programs, and a bridge 106 that connects the MPU 105 to a DRAM 107 and bus 108. The processor 103 also comprises the DRAM 107 that temporarily stores, for example, programs executed by the MPU 105 and data, and the bus 108 that interconnects constituent elements of the processor 103. The processor 103 further comprises a graphic adaptor 109 having a control function of displaying graphic information on the display 113, an HDD controller 110 that controls the HDD 114, and a UI controller 111 that controls the UI 115. In addition, the processor 103 comprises a communication I/F 112 that controls communication complying with standards such as USB2.0 or IEEE802.11g.

Figure 2:
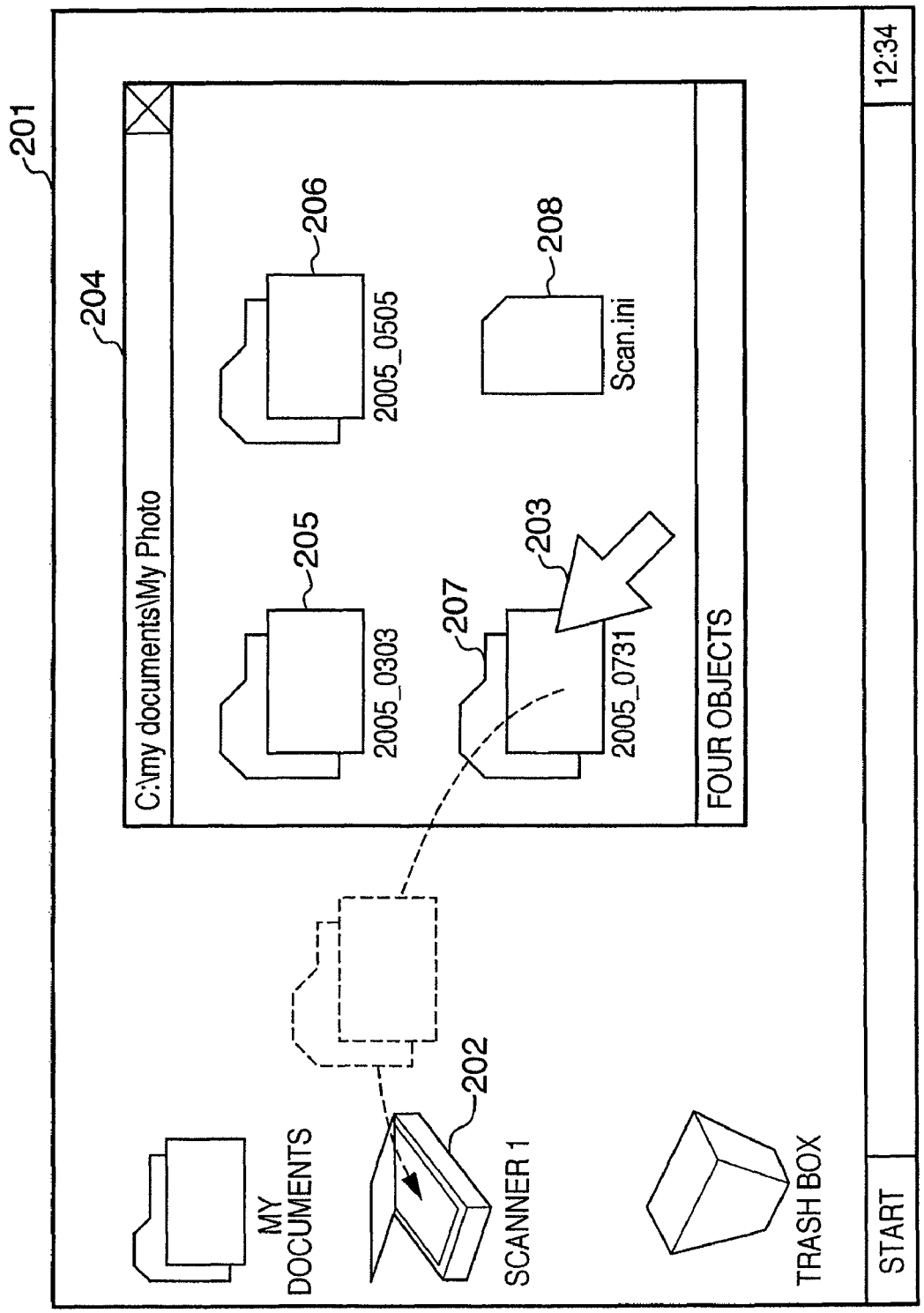
FIG. 2 is a view showing an example of graphic information displayed by a display.

The display 113 is a display device for displaying such graphic information as shown in FIG. 2.

The HDD 114 is a storage device for storing the control programs to be executed by the MPU 105, image data obtained from the scanner 102, and the like. As the storage device, it is also possible to use, for example, a DVD-RAM or compact flash (registered trademark) in place of or in addition to the HDD 114.

The UI 115 includes, for example, a keyboard and mouse, and receives instructions from the user to the PC 101.

The scanner 102 comprises a controller 104, a line image sensor 124 that obtains an electrical signal from an original by photoelectric conversion, and an LF motor 125 that drives the line image sensor 124, etc.

The controller 104 of the scanner 102 comprises a bus 116 that connects constituent elements of the controller 104 to each other. The controller 104 also comprises a gate array 117 containing various functions such as a function of reading information of an original from the line image sensor 124, a function of memory address decoding, and a function of a mechanism that generates control pulses to a carrier motor. The controller 104 further comprises an MCU (Micro Controller Unit) 118 that controls the whole scanner 102 in accordance with control programs, and a communication I/F 119 that controls communication complying with standards such as USB2.0 or IEEE802.11g. In addition, the controller 104 comprises a ROM 120 storing the control programs, and a RAM 121 storing various data such as image data and correction data. Also, the controller 104 comprises an A/D converter 122 that converts an analog signal obtained from the line image sensor 124 into a digital signal, and an LF driver 123 that drives the LF motor 125 by converting motor control pulses output from the MCU 118 into an electrical signal.

Note that the scanner 102 is a flat bed scanner in this embodiment, but the present invention is not limited to this scanner.

<Outline of System Operation>

FIG. 2 is a view showing an example of graphic information displayed by the display 113.

A main window 201 is generated by an OS (Operating System) such as Windows (registered trademark). The user and PC 101 exchange various kinds of information with each other via the main window 201.

A scanner icon 202 is used to activate an application (to be referred to as "a scan application" hereinafter) that is stored in the HD 114 and controls the scanner 102.

A mouse pointer 203 moves in accordance with an operation on the UI 115, and designates, for example, execution of an operation associated with a predetermined window or icon.

A folder window 204 displays subfolders and files contained in a predetermined folder (in this example, \my documents\My Photo). The folder has a hierarchical structure. All folders and files including those shown in FIG. 2 are stored in a storage device such as the HDD 114.

Folder icons 205 to 207 indicate subfolders contained in the folder indicated by the folder window 204.

A read control information file 208 contains information for designating the resolution and the like when the scanner 102 scans an original.

The user performs an operation explained below in the main window 201 to allow the PC 101 to obtain image data from the scanner 102.

First, while an original is set on the scanner 102, the user moves the mouse pointer 203, and drags and drops, on the scanner icon 202, the icon of a folder in which image data is to be saved. In the example shown in FIG. 2, a folder (C:\my documents\My Photo\2005_0731) indicated by the folder icon 207 is the storage destination folder of the image data.

When the folder icon 207 is dropped on the scanner icon 202, the scan application starts. At this point, information indicating the location of the folder indicated by the folder icon 207 (C:\my documents\My Photo\2005_0731) is transferred as an argument to the scan application.

The scan application searches the folder indicated by the argument for the read control information file. If the read control information file is found, the scan application instructs the scanner 102 to scan the image data in accordance with the contents. The scan application then saves the image data scanned by the scanner 102 in the folder indicated by the argument.

If no read control information file is found in the folder indicated by the argument, the scan application instructs the scanner 102 to scan the image data in accordance with default read control information. Alternatively, if no read control information file is found in the folder indicated by the argument, the scan application may also search a folder (in the example shown in FIG. 2, C:\my documents\My Photo) in an upper (i.e. higher) hierarchical layer for the read control information file. In the example shown in FIG. 2, the scan application finds the read control information file 208. However, if the read control information file 208 does not exist, the scan application may also search a folder in a still higher hierarchical layer.

The search of a folder in an upper hierarchical layer may be performed by tracing back to a root folder (C:\), or the scan application may be configured to perform the search by tracing back to only a predetermined folder. When a plurality of users share the PC 101 and a folder for saving image data and the like is set for each user (e.g., C:\Documents and Settings\Taro\My Documents for user Taro), the scan application may be configured to perform the search to only a home directory (e.g., C:\Documents and Settings\Taro) of the user.

Note that the window configuration and scan application activation procedure explained with reference to FIG. 2 are merely examples. It is also possible to use another window configuration and another scan application activation procedure, as long as the user can readily designate a storage destination folder to the scan application.

<Configuration of Read Control Information File>

The read control information file can hold read control information in the form of binary data that the scan application uses, or in the form of text data so that the user can read it. When holding the read control information in the form of text data, the scan application obtains the read control information by parsing the text.

FIG. 4 is a view showing an example of a read control information file generation window 401 by which the user generates a read control information file. For example, the scan application displays the read control information file generation window 401 in the main window 201.

The user sets various kinds of read control information such as the type and size of an original by using fields 402 to 409. When the user clicks an OK button 410, a read control information file having the set contents is generated.

Note that although not shown, the read control information file generation window 401 may also contain a field that designates a folder for storing the read control information file. This field may also be configured to be able to designate a plurality of folders. When a plurality of folders are designated, the generated read control information file is stored in all the designated folders. The user can also edit the existing read control information file by using the read control information file generation window 401.

The user can also generate or edit a read control information file by using a text editor or the like if the file is in the form of text data. The user may also use the existing read control information file by copying it to a desired folder.

<Sequence of Image Data Obtaining Process>

Figure 3:
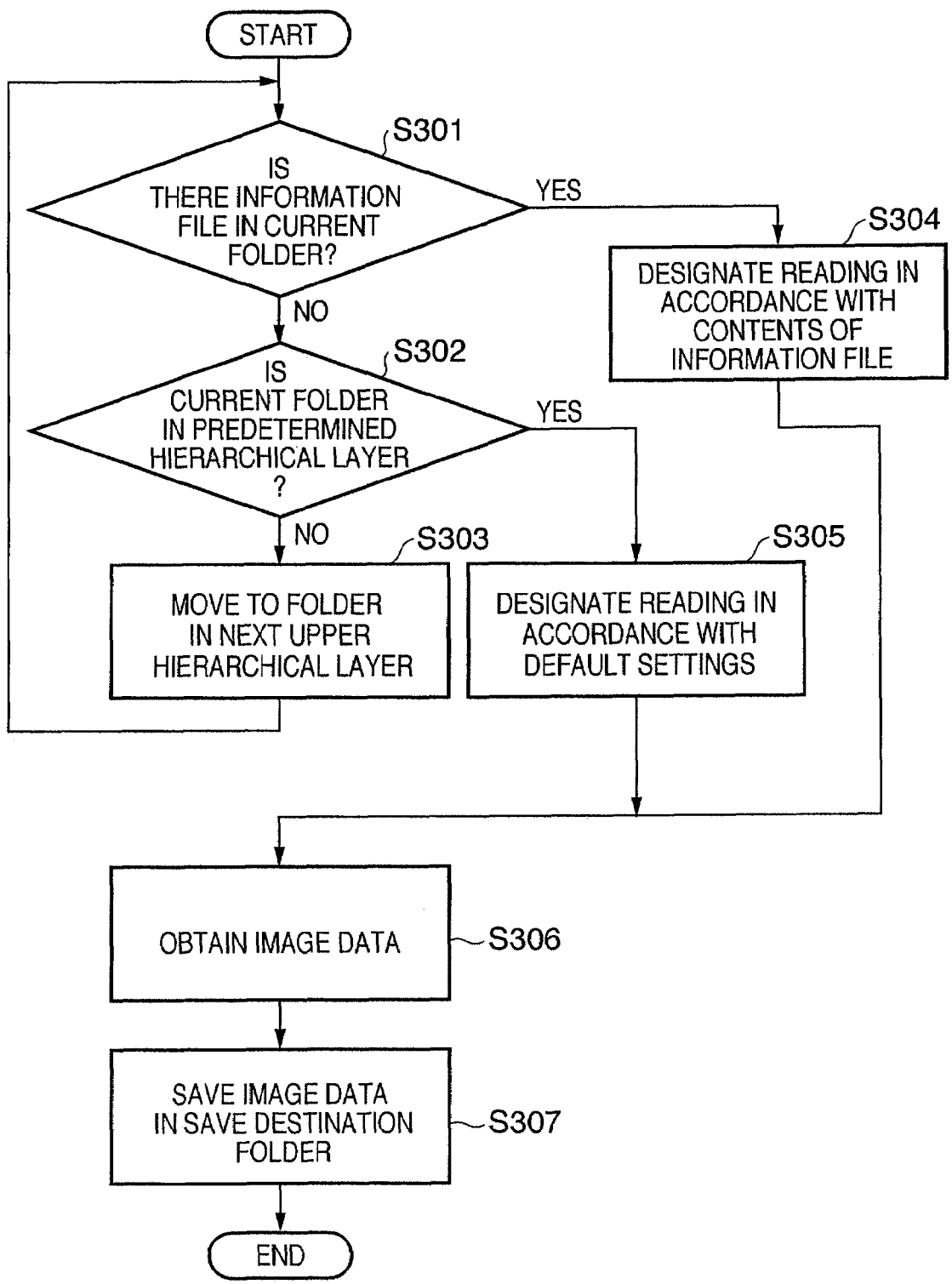
FIG. 3 is a flowchart showing an example of the sequence of processing by which a scan application obtains image data and saves it in an HDD in the first embodiment.

FIG. 3 is a flowchart showing an example of the sequence of processing by which the scan application obtains image data and saves it in the HDD 114. When a folder icon is dropped on the scanner icon 202 in the main window 201, the processing of this flowchart starts.

Note that the MPU 105 implements processes in individual steps explained below by executing the control program (OS), scan application, and the like.

In step S301, the MPU 105 searches a storage destination folder (i.e., a folder indicated by the folder icon dropped on the scanner icon 202) designated by the user for a read control information file, thereby determining whether the file exists. If the file exists, the process advances to step S304; if not, the process advances to step S302.

In step S302, the MPU 105 determines whether the folder searched in step S301 is a predetermined folder (i.e., a folder in an uppermost hierarchical layer to be traced) explained with reference to FIG. 2. If the folder is the predetermined folder, the process advances to step S305; if not, the process advances to step S303.

In step S303, the MPU 105 changes a folder to be searched to a folder in a next upper hierarchical layer, and the process returns to step S301. However, the storage destination folder remains unchanged.

In step S304, the MPU 105 instructs the scanner 102 to scan an original in accordance with the contents of the read control information file found in step S301, and the scanner 102 scans the original.

In step S305, the MPU 105 instructs the scanner 102 to scan an original in accordance with default settings (i.e., default read control information), and the scanner 102 scans the original.

In step S306, the MPU 105 obtains the image data from the scanner 102.

In step S307, the MPU 105 stores the obtained image data in the storage destination folder. Although the MPU 105 saves the image data by using a file name complying with a predetermined rule (e.g., scan_XXX.jpg; XXX are consecutive numbers), another file name may also be used.

In this embodiment as has been explained above, the scan application determines a storage destination folder when a folder icon is dropped on the scanner icon. Also, the scan application searches the storage destination folder and, if necessary, a folder in an upper hierarchical layer for a read control information file, and instructs the scanner to scan image data in accordance with the contents of the read control information file.

This makes it possible to further simplify the operation required to scan an original by the scanner, and reduces user's labor.

Second Embodiment

The first embodiment cannot add any newly obtained image data as a new page to a file (e.g., PDF or MultiPageT-IFF) having a format capable of holding image data formed by a plurality of pages. Therefore, the second embodiment extends the first embodiment to allow a user to notify a scan application of read control information or instruct the scan application to start scanning by dropping a file icon on a scanner icon 202 shown in FIG. 2.

Note that in this embodiment, the arrangements of the PC 101 and scanner 102 are the same as in the first embodiment, so an explanation thereof will be omitted.

<Outline of System Operation>

Figure 5:
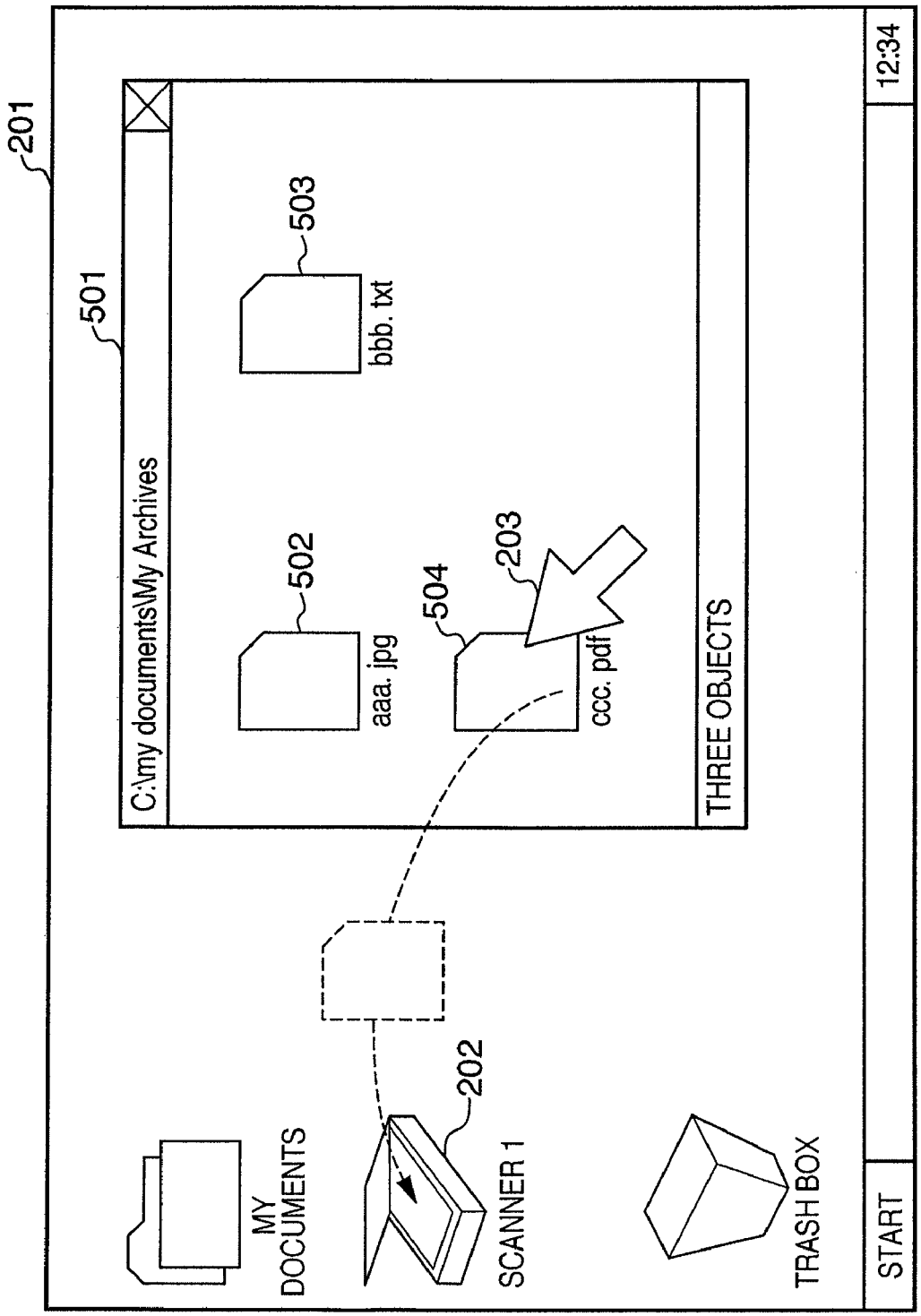
FIG. 5 is a view showing a main window in the second embodiment.

FIG. 5 is a view showing a main window 201 in the second embodiment. In FIG. 5, the same reference numerals as in the first embodiment (FIG. 2) denote the same elements, and an explanation thereof will be omitted.

A folder window 501 is similar to the folder window 204, but indicates a folder different from that shown in the folder window 204. The folder indicated by the folder window 501 stores three files indicated by file icons 502 to 504. The folder has a hierarchical structure; the folder indicated by the folder window 501 may further store subfolders or read control information files.

The file indicated by the file icon 502 is a JPEG file. A JPEG file cannot hold image data formed by a plurality of pages, but has information such as the size of an original and resolution. The scan application can use these pieces of information as read control information.

The file indicated by the file icon 503 is a text file. A text file can neither hold image data formed by a plurality of pages, nor have information such as the size of an original and resolution.

The file indicated by the file icon 504 is a PDF file. A PDF file can hold image data formed by a plurality of pages, and each page can have information such as the size of an original and resolution.

In the main window 201 of this embodiment, the user drops not a folder icon but a file icon on a scanner icon 202 to allow a PC 101 to obtain image data from a scanner 102. In the example shown in FIG. 5, the file indicated by the file icon 504 is a reference file when obtaining and saving image data.

When the file icon 504 is dropped on the scanner icon 202, the scan application starts. At this point, the file (C:\my documents\My Archives\ccc.pdf) indicated by the file icon 504 is transferred as an argument to the scan application.

The scan application searches the file indicated by the argument for information usable as the read control information. If the information is found, the scan application instructs the scanner 102 to scan the image data in accordance with the contents. The scan application saves the image data scanned by the scanner 102 in a location corresponding to the type of the file indicated by the argument.

That is, if the file indicated by the argument is capable of holding image data formed by a plurality of pages, the scan application adds the obtained image data as a new page to the file. The location of the addition can be any arbitrary location such as the head or end of the pages. If the file indicated by the argument is incapable of holding image data formed by a plurality of pages, the scan application saves the obtained image data as a new file. The save location of the new file is, for example, the folder in which the file indicated by the argument has been stored.

If information usable as the read control information is not found in the file indicated by the argument, the scan application instructs the scanner 102 to scan the image data in accordance with default read control information. It is also possible to search for a read control information file following the same procedures as in the first embodiment.

Note that the window configuration and scan application activation procedure explained with reference to FIG. 5 are merely examples. It is also possible to use another window configuration and another scan application activation procedure, as long as the user can readily designate, to the scan application, a file from which read control information is obtained and which is used as the destination for addition.

<Sequence of Image Data Obtaining Process>

Figure 6:
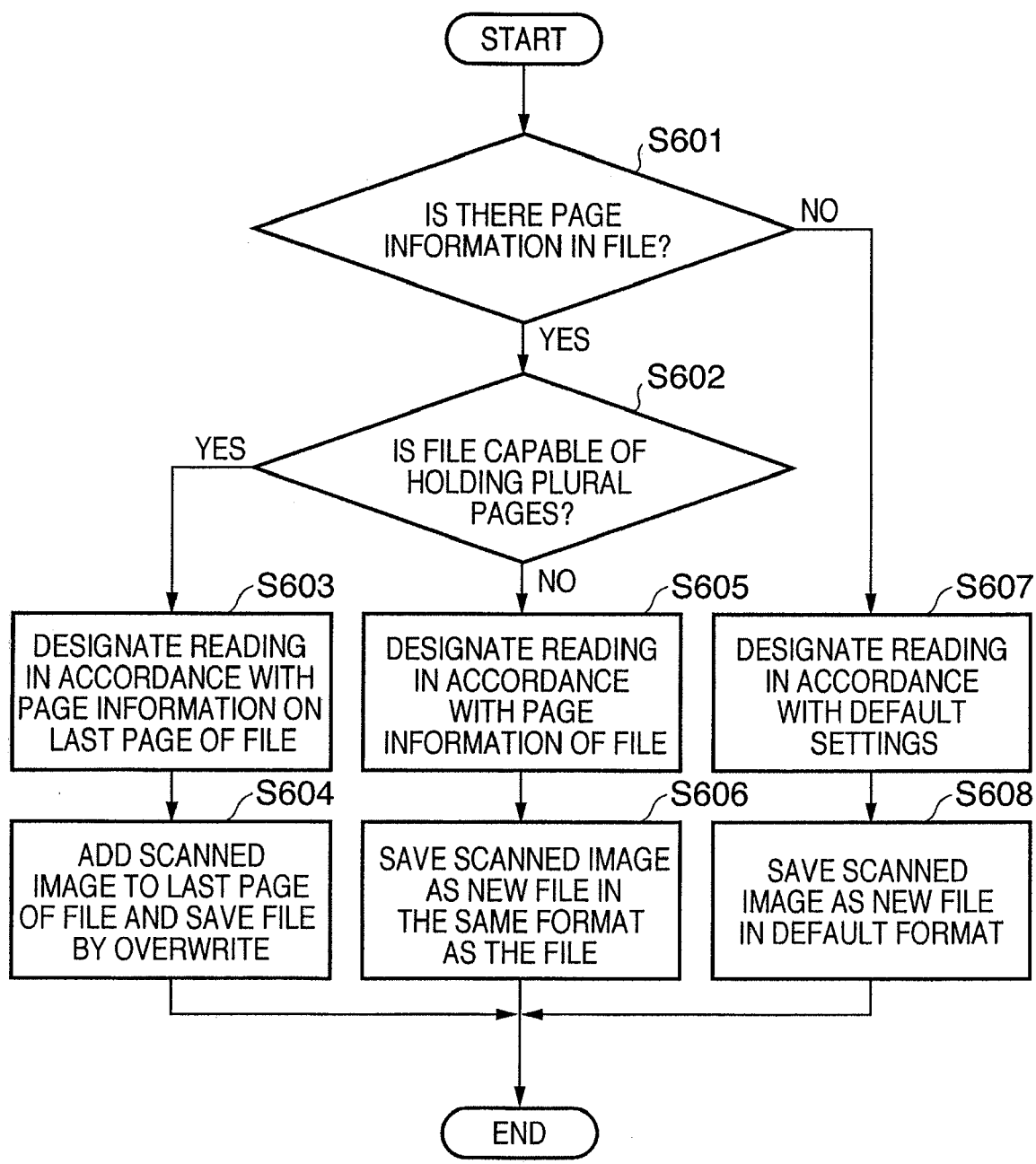
FIG. 6 is a flowchart showing an example of the sequence of processing by which a scan application obtains image data and saves it in an HDD in the second embodiment.

FIG. 6 is a flowchart showing an example of the sequence of processing by which the scan application obtains image data and saves it in an HDD 114. When a file icon is dropped on the scanner icon 202 in the main window 201, the processing of this flowchart starts.

Note that an MPU 105 implements processes in individual steps explained below by executing the control program (OS), scan application, and the like.

In step S601, the MPU 105 searches a reference file designated by the user for page information (information such as the size of an original and resolution), thereby determining whether the page information exists. If the information exists, the process advances to step S602; if not, the process advances to step S607.

In step S602, the MPU 105 determines whether the reference file can hold image data formed by a plurality of pages. If the result is YES in step S602, the flow advances to step S603. If the result is NO in step S602, the process advances to step S605.

In step S603, the MPU 105 instructs the scanner 102 to scan an original in accordance with the page information of the last page (or another page) of the reference file, and the scanner 102 scans the original.

In step S604, the MPU 105 obtains the image data from the scanner 102, and adds the obtained image data to the end (or another position) of the reference file.

In step S605, the MPU 105 instructs the scanner 102 to scan the original in accordance with the page information of the reference file, and the scanner 102 scans the original.

In step S606, the MPU 105 obtains the image data from the scanner 102, and saves the obtained image data in the same folder as the reference file by using the same file format as the reference file.

In step S607, the MPU 105 instructs the scanner 102 to scan the original in accordance with default settings (read control information), and the scanner 102 scans the original.

In step S608, the MPU 105 obtains the image data from the scanner 102, and saves the obtained image data in the same folder as the reference file by using a default format.

Note that the processes in steps S607 and S608 may also be replaced with the same processes as in the first embodiment. In this case, a folder storing the reference file is deemed as a reference folder, and the processes in the individual steps shown in FIG. 3 are executed.

Figure 7:
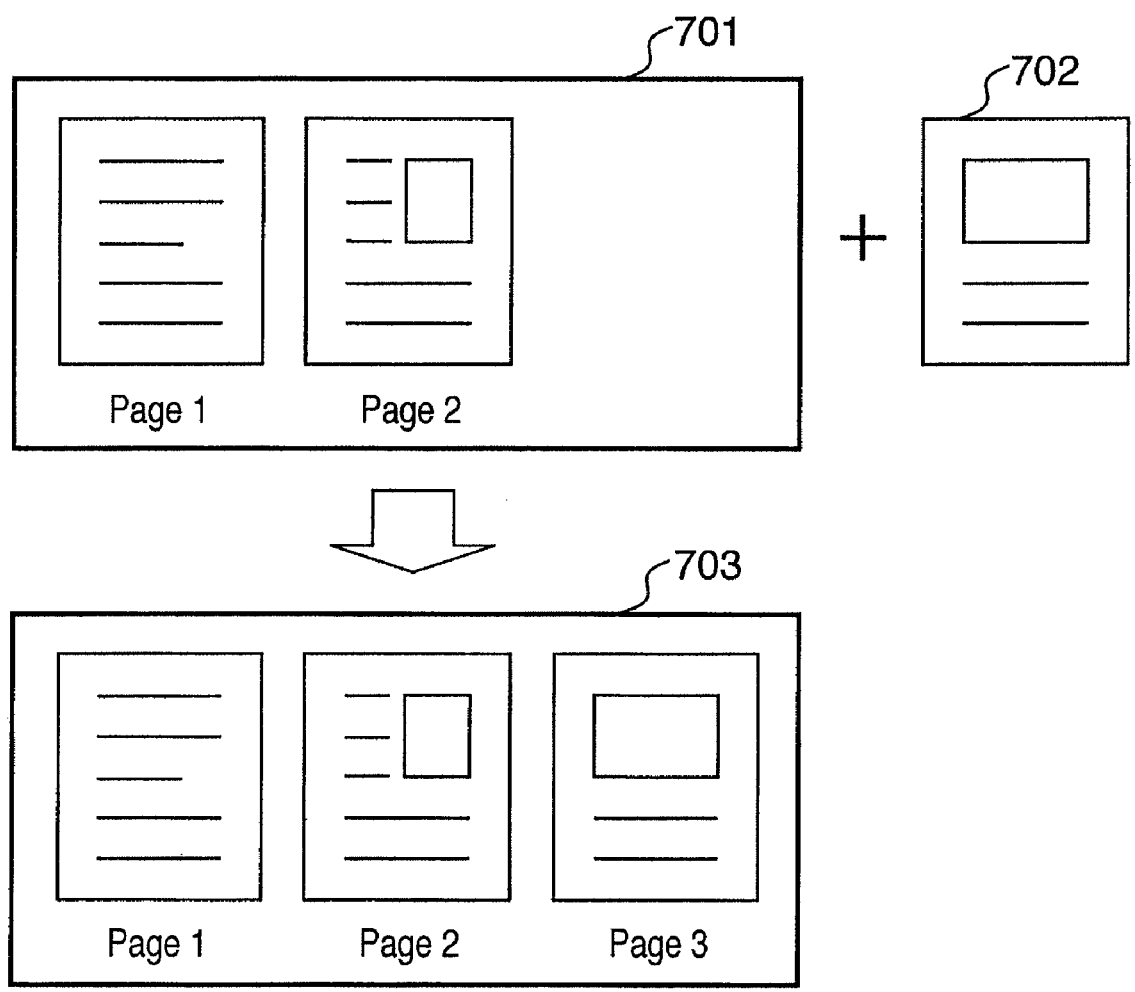
FIG. 7 is a view showing the way a new page is added to a reference file in step S604 of FIG. 6.

FIG. 7 is a view showing the way a new page is added to the reference file in step S604.

A file 701 is the reference file before the new page is added. Image data 702 is obtained from the scanner 102 by the scan application. As shown in FIG. 7, a file 703 is generated by adding the image data 702 to the file 701.

In this embodiment as has been explained above, the user can drop not a folder icon but a file icon on the scanner icon. This makes a scanning process using the same format as the dropped file possible. This also facilitates adding newly obtained image data as a new page to a file having a format capable of holding image data formed by a plurality of pages.

Other Embodiments

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a floppy® disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (Operating System) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-117186, filed on Apr. 20, 2006, which is hereby incorporated by reference herein in its entirety.

What is claimed is:

1. An image capturing apparatus comprising a processor and a memory storing a program executable by the processor for capturing an image, wherein the image capturing apparatus includes:
a designation unit, to designate data stored in the memory, in accordance with an instruction from a user;
a determination unit, to determine whether a format of the data designated by the designation unit is a first format, capable of forming the designated data of a plurality of pages, each of which includes control information, or a second format, where the designated data is formed of a single page that includes control information, the control information designating how to control execution of a reading operation of an image reading apparatus;
an extraction unit, to extract, in accordance with a determination result of the determination unit, the control information from the designated data, wherein, if it is determined by the determination unit that the format of the designated data is the first format, the extraction unit extracts the control information from a given page of the plurality of pages of the designated data;
a control unit, to control execution of a reading operation of the image reading apparatus to create image data in accordance with the control information extracted by the extraction unit;
an obtaining unit, to obtain image data from the image reading apparatus under control of the control unit; and
a storage unit, to store the image data obtained by the obtaining unit in a folder in which the designated data has been stored by (i) adding the obtained image data to the designated data as a new page located next to a given page of the plurality of pages of the designated data, if it is determined by the determination unit that the format of the designated data is the first format, and by (ii) storing the obtained image data as new data having a same format as the format of the designated data, if it is determined by the determination unit that the format of the designated data is the second format, wherein, if the extraction unit cannot extract the control information, the control unit controls the image reading apparatus to read image data in accordance with predetermined control information and the storage unit stores the obtained image data in the folder in which the designated data has been stored by storing the obtained image data as new data whose format is a predetermined.

2. The image capturing apparatus according to claim 1, wherein the image capturing apparatus further comprises:

a display unit, to display a first icon corresponding to the image reading apparatus and at least one additional icon corresponding to data; and a moving unit, to move a display position of the at least one additional icon in response to an instruction by the user, wherein the designation unit designates data corresponding to the at least one additional icon in response to the at least one additional icon being superposed on the first icon by the moving unit.

3. A method for controlling an image capturing apparatus including a communications unit, which communicates with an image reading apparatus, and a memory, which manages data by using a plurality of folders, the method comprising steps of:

designating data stored in the memory, in accordance with an instruction from a user;

determining whether a format of the data designated in the designating step is a first format, capable of forming the designated data of a plurality of pages, each of which includes control information, or a second format, where the designated data is formed of a single page that includes control information, the control information designating how to control execution of a reading operation of an image reading apparatus;

extracting, in accordance with a determination result of the determining step, the control information from the designated data, wherein, if it is determined in the determining step that the format of the designated data is the first format, the extracting step extracts the control information from a given page of the plurality of pages of the designated data;

controlling execution of a reading operation of the image reading apparatus to create image data in accordance with the control information extracted in the extracting step;

obtaining image data from the image reading apparatus under control in the controlling step; and storing the image data obtained in the obtaining step in a folder in which the designated data has been stored by (i) adding the obtained image data to the designated data as a new page located next to a given page of the plurality of pages of the designated data, if it is determined in the determining step that the format of the designated data is the first format, and by (ii) storing the obtained image data as new data having a same format as the format of the designated data, if it is determined in the determining step that the format of the designated data is the second format, wherein, if the extracting cannot extract the control information, image data is read in accordance with predetermined control information and the obtained image data is stored in the folder in which the designated data has been stored by storing the obtained image data as new data whose format is a predetermined.

4. A computer-readable storage medium storing computer-executable code that, when executed by a computer, causes the computer to implement a method for controlling an image capturing apparatus including a communications unit, which communicates with an image reading apparatus, and a memory, which manages data by using a plurality of folders, wherein the method comprises steps of:

designating data stored in the memory, in accordance with an instruction from a user;

determining whether a format of the data designated in the designating step is a first format, capable of forming the designated data of a plurality of pages, each of which includes control information, or a second format, where the designated data is formed of a single page that includes control information, the control information designating how to control execution of a reading operation of an image reading apparatus;

extracting, in accordance with a determination result of the determining step, the control information from the designated data, wherein, if it is determined in the determining step that the format of the designated data is the first format, the extracting step extracts the control information from a given page of the plurality of pages of the designated data;

controlling execution of a reading operation of the image reading apparatus to create image data in accordance with the control information extracted in the extracting step;

obtaining image data from the image reading apparatus under control in the controlling step; and storing the image data obtained in the obtaining step in a folder in which the designated data has been stored by (i) adding the obtained image data to the designated data as a new page located next to a given page of the plurality of pages of the designated data, if it is determined in the determining step that the format of the designated data is the first format, and by (ii) storing the obtained image data as new data having a same format as the format of the designated data, if it is determined in the determining step that the format of the designated data is the second format, wherein, if the extracting cannot extract the control information, image data is read in accordance with predetermined control information and the obtained image data is stored in the folder in which the designated data has been stored by storing the obtained image data as new data whose format is a predetermined.

5. The method according to claim 3 further comprising the steps of:

displaying a first icon corresponding to the image reading apparatus and at least one additional icon corresponding to data; and moving a display position of the at least one additional icon in response to an instruction by the user, and designating data corresponding to the at least one additional icon in response to the at least one additional icon being superposed on the first icon.

6. The computer-readable storage medium according to claim 4, the method steps further comprising:

displaying a first icon corresponding to the image reading apparatus and at least one additional icon corresponding to data; and moving a display position of the at least one additional icon in response to an instruction by the user, and designating data corresponding to the at least one additional icon in response to the at least one additional icon being superposed on the first icon.

* * * * *